US012732907B2

(12) United States Patent
Daniel et al.

(10) Patent No.: US 12,732,907 B2
(45) Date of Patent: Sep. 8, 2026

(54) REDUCING BEAMFORMING POWER CONSUMPTION IN A WIRELESS COMMUNICATIONS SYSTEM (WCS)

(71) Applicant: ANI Acquisition Sub, LLC, Boca Raton, FL (US)

(72) Inventors: Moshe Daniel, Gedera (IL); Eitan Orcaby, Rishon Lezion (IL); Roi Yosy Ziv, Ramat-Gan (IL)

(73) Assignee: ANI Acquisition Sub, LLC, Boca Raton, FL (US)

( * ) Notice: Subject to any disclaimer, the term of this patent is extended or adjusted under 35 U.S.C. 154(b) by 390 days.

(21) Appl. No.: 18/122,242

(22) Filed: Mar. 16, 2023

(65) Prior Publication Data

US 2024/0314685 A1 Sep. 19, 2024

(51) Int. Cl.

| | |
|---|---|
| ***H04W 52/02*** | (2009.01) |
| ***H04B 7/0408*** | (2017.01) |
| ***H04B 7/06*** | (2006.01) |

(52) U.S. Cl.

CPC ...... *H04W 52/0206* (2013.01); *H04B 7/0408* (2013.01); *H04B 7/0617* (2013.01)

(58) Field of Classification Search

CPC ............. H04W 52/0206; H04B 7/0408; H04B 7/0617

See application file for complete search history.

(56) References Cited

U.S. PATENT DOCUMENTS 5,019,793 A 5/1991 McNab
5,630,154 A 5/1997 Bolstad et al.
(Continued)

FOREIGN PATENT DOCUMENTS

| | | | |
|---|---|---|---|
| EP | 2113145 | B1 | 1/2011 |
| WO | 2017/008257 | A1 | 1/2017 |
| WO | 2018/186967 | A1 | 10/2018 |

OTHER PUBLICATIONS

Anchora et al; "Resource Allocation and Management in Multi-Operator Cellular Networks With Shared Physical Resources"; IEEE, (2012) pp. 296-300.

(Continued)

*Primary Examiner* — Ayodeji O Ayotunde
(74) *Attorney, Agent, or Firm* — Greenberg Traurig, LLP; Mammen ("Roy") P. Zachariah

(57) ABSTRACT

Reducing beamforming power consumption in a wireless communications system (WCS) is disclosed. In the WCS, a wireless node(s) is configured to emit a data-bearing radio frequency (RF) beam(s) in an intended direction(s). Specifically, the wireless node(s) is configured to form the data-bearing RF beam(s) by preprocessing a data signal based on a beamforming codeword to generate multiple beamforming signals, amplifying the beamforming signals to certain output powers using multiple power amplifiers, and emitting the amplified beamforming signals simultaneously from multiple antenna elements. In embodiments disclosed herein, the wireless node(s) can be configured to suppress a sidelobe(s) associated with the data-bearing RF beam(s) without sacrificing efficiency and/or increasing power consumption of the power amplifiers. As a result, the wireless node(s) can achieve improved adjacent channel power ratio (ACPR), adjacent channel leakage ratio (ACLR), and/or error vector magnitude (EVM) concurrent to reducing beamforming power consumption.

20 Claims, 11 Drawing Sheets

(56) References Cited

U.S. PATENT DOCUMENTS

| | | | |
|---|---|---|---|
| 6,504,517 | B1 | 1/2003 | Liu et al. |
| 6,504,636 | B1 | 1/2003 | Seto et al. |
| 7,593,729 | B2 | 9/2009 | Barak et al. |
| 7,663,546 | B1 | 2/2010 | Miyamoto et al. |
| 8,310,975 | B2 | 11/2012 | Sundaresan et al. |
| 9,042,276 | B1 | 5/2015 | Harel et al. |
| 9,712,191 | B2 | 7/2017 | Johansson et al. |
| 9,806,412 | B2 | 10/2017 | Deng et al. |
| 9,960,823 | B2 | 5/2018 | Kim et al. |
| 9,960,825 | B2 | 5/2018 | Petersson et al. |
| 10,075,852 | B2 | 9/2018 | Nekovee |
| 10,756,429 | B1 | 8/2020 | Marupaduga et al. |
| 11,336,125 | B2 | 5/2022 | Kimball et al. |
| 11,362,721 | B2 | 6/2022 | Nagaraj et al. |
| 2002/0187812 | A1 | 12/2002 | Guo |
| 2003/0052828 | A1 | 3/2003 | Scherzer et al. |
| 2004/0252055 | A1 | 12/2004 | Thomas et al. |
| 2005/0221861 | A1 | 10/2005 | Zeira |
| 2006/0133535 | A1 | 6/2006 | Jung et al. |
| 2007/0025316 | A1 | 2/2007 | Yamasaki et al. |
| 2007/0099578 | A1 | 5/2007 | Adeney et al. |
| 2009/0201903 | A1* | 8/2009 | Ghady ................. H04B 7/0639 370/342 |
| 2010/0234035 | A1 | 9/2010 | Fujishima et al. |
| 2010/0273499 | A1 | 10/2010 | Van et al. |
| 2011/0255434 | A1 | 10/2011 | Ylitalo |
| 2011/0305164 | A1 | 12/2011 | Zhang et al. |
| 2012/0071184 | A1 | 3/2012 | Lin |
| 2013/0004176 | A1 | 1/2013 | Sato et al. |
| 2013/0059619 | A1 | 3/2013 | Kim et al. |
| 2013/0236180 | A1 | 9/2013 | Kim et al. |
| 2013/0286960 | A1 | 10/2013 | Li et al. |
| 2013/0301454 | A1 | 11/2013 | Seol et al. |
| 2014/0010149 | A1 | 1/2014 | Cook |
| 2014/0146692 | A1 | 5/2014 | Hazani et al. |
| 2014/0307610 | A1 | 10/2014 | Rudrapatna et al. |
| 2014/0327576 | A1 | 11/2014 | Kumar |
| 2014/0362688 | A1 | 12/2014 | Zhang et al. |
| 2015/0003548 | A1 | 1/2015 | Thomas et al. |
| 2015/0263424 | A1 | 9/2015 | Sanford et al. |
| 2015/0312913 | A1 | 10/2015 | Schmidt et al. |
| 2015/0334726 | A1 | 11/2015 | Gao et al. |
| 2015/0365143 | A1 | 12/2015 | Chai et al. |
| 2015/0365934 | A1 | 12/2015 | Liu et al. |
| 2016/0087705 | A1 | 3/2016 | Guey et al. |
| 2016/0103199 | A1 | 4/2016 | Rappaport |
| 2016/0164587 | A1 | 6/2016 | Pu et al. |
| 2016/0191124 | A1 | 6/2016 | Kim |
| 2016/0248451 | A1 | 8/2016 | Weissman et al. |
| 2016/0337916 | A1 | 11/2016 | Deenoo et al. |
| 2016/0352002 | A1 | 12/2016 | Aue |
| 2016/0360536 | A1 | 12/2016 | Bae |
| 2017/0033904 | A1 | 2/2017 | Stirling-Gallacher et al. |
| 2017/0214444 | A1 | 7/2017 | Nigam et al. |
| 2017/0229774 | A1 | 8/2017 | Schuehler et al. |
| 2017/0272872 | A1 | 9/2017 | Bauman et al. |
| 2017/0273058 | A1 | 9/2017 | Agiwal et al. |
| 2017/0331533 | A1 | 11/2017 | Strong |
| 2018/0115354 | A1 | 4/2018 | Athley et al. |
| 2018/0277151 | A1 | 9/2018 | Matsuo et al. |
| 2018/0295639 | A1 | 10/2018 | Bhushan et al. |
| 2018/0331731 | A1 | 11/2018 | Boudreau et al. |
| 2019/0020407 | A1 | 1/2019 | Gharavi et al. |
| 2019/0097712 | A1 | 3/2019 | Singh et al. |
| 2019/0166527 | A1 | 5/2019 | Oketani et al. |
| 2019/0237874 | A1 | 8/2019 | Michaelis et al. |
| 2020/0107285 | A1 | 4/2020 | Prakash et al. |
| 2020/0128455 | A1 | 4/2020 | Da et al. |
| 2020/0229117 | A1 | 7/2020 | Abedini et al. |
| 2020/0344035 | A1 | 10/2020 | Fackler et al. |
| 2021/0037447 | A1 | 2/2021 | Tarighat Mehrabani |
| 2021/0076228 | A1 | 3/2021 | Han |
| 2022/0021430 | A1* | 1/2022 | Hadjichirstos ....... H04B 7/0617 |
| 2022/0095257 | A1 | 3/2022 | Castaneda et al. |
| 2022/0149907 | A1 | 5/2022 | Göransson |
| 2022/0149911 | A1 | 5/2022 | Li et al. |
| 2022/0155439 | A1 | 5/2022 | Rindal et al. |
| 2022/0159480 | A1 | 5/2022 | Lu et al. |
| 2022/0173783 | A1 | 6/2022 | Dash et al. |
| 2022/0191855 | A1 | 6/2022 | Akkarakaran et al. |
| 2022/0201389 | A1 | 6/2022 | Hassani et al. |
| 2022/0201675 | A1 | 6/2022 | Akkarakaran et al. |
| 2022/0286867 | A1 | 9/2022 | Siomina et al. |

OTHER PUBLICATIONS

Artiga et al; "Shared Access Satelite-Terrestrial Reconfigurable Backhaul Network Enabled by Smart Antennas at mmWAVE Band"; IEEE Network (2018); pp. 46-53.

Aydin et al; "Energy-Spectral Efficiency Tradeoffs in 5G Multi-Operator Networks With Heterogeneous Constraints"; IEEE Transactions on Wireless Communications; vol. 16, No. 9 (2017) pp. 5869-5881.

Badia et al; "A Tunable Framework for Performance Evaluation of Spectrum Sharing in LTE Networks"; IEEE (2013); 3 Pages.

Ellingson et al; "The LWA1 Radio Telescope"; IEEE Transactions on Antennas and Propagation; vol. 61, No. 5 (2013); pp. 2540-2549.

Fund et al; "Resource Sharing Among mmWAVE Cellular Service Providers in a Vertically Differentiated Duopoly"; IEEE IOC (2017); 7 Pages.

Gomes et al; "Optical Fronthaul Options for Meeting 5G Requirements"; IEEE (2018); pp. 1-4.

Gozalves; "Fifth-Generation Technologies Trials"; IEEE Vehicular Technology Magazine; (2016) pp. 5-13.

Gupta et al; "On the Feasibility of Sharing Spectrum Licenses in mmWAVE Cellular Systems"; IEEE Transactions on Communications, vol. 64, No. 9; (2016); pp. 3981-3995.

Hiltunen et al; "Performance of Neighboring Indoor 5G Micro Operators With Dynamic TDD"; IEEE (2018) pp. 59-64.

Hiltunen et al; "Propagation Model for Evaluating the Interference Between Neighboring Indoor Micro Operators"; IEEE (2018); 6 Pages.

Huang et al; "High-Speed Wireless Applications"; Wiley; (2008) pp. 255-271.

Jurdi et al; "A Model for Infrastructure Sharing in mmWAVE Cellular Networks"; IEEE, 2018; 6 Pages.

Jurdi et al; "Modeling Infrastructure Sharing in mmWAVE Networks With Shared Spectrum Licenses"; IEEE Transactions on Cognitive Communications and Networking, vol. 4, No. 2 (2018) pp. 328-343.

Kant et al; "Embrace: a Multi-Beam 20,000-Element Radio Astronomical Phased Array Antennj Demonstrator"; IEEE Transactions on Antennas and Propagation, vol. 59., No. 6 (2011); pp. 1990-2003.

Manosha et al; "Framework for Spectrum Authorization Elements and Its Application to 5G Micro-Operators"; IEEE (2017); 8 Pages.

Mueck et al; "Licensed Shared Access for mmWAVE Cellular Broadband Communications"; IEEE; 2014; 5 Pages.

Naik et al; "Coexistence of Wireless Technologies in the 5 GHz Bands: A Survey of Existing Solutions and a Roadmap for Future Research"; IEEE Communication Surveys & Tutorials, vol. 20, No. 3, (2018) pp. 1777-1798.

Olvera et al; "Numerical Analysis of Reconfigurable Plasma Antenna Arrays"; IEEE, (2015) 5 Pages.

Rebato et al; "Resource Sharing in 5G mmWAVE Cellular Networks"; IEEE; (2016); 6 Pages.

Saha et al; "Bandwidth Partitioning and Downlink Analysis in Millimeter Wave Integrated Access and Backhaul for 5G"; IEEE Transactions on Wireless Communications; vol. 17, No. 12, (2018) pp. 8195-8210.

Shokri-Ghadikolaei et al; "Spectrum Sharing in mmWAVE Cellular Networks via Cell Association, Coordination, and Beamforming"; IEEE Journal on Selected Areas in Communications, vol. 34, No. 11 (2016) pp. 2902-2917.

Shokri-Ghadikolaei et al; "The Impact of Beamforming and Coordination on Spectrum Pooling in mmWAVE Cellular Networks", 50th Asilomar Conference on Signals, Systems and Computers, 2016, 6 Pages.

(56) References Cited

OTHER PUBLICATIONS

Zhang et al; "Optimal and Suboptimal Beamforming for Multi-Operator Two-Way Relaying Nith a MIMO Amplify-And-Forward Relay"; IEEE (2012); 5 Pages.
Zhang et al; "Sum Rate Maximization in Multi-Operator Two-Way Relay Networks With a MIMO AF Relay via POTDC"; EUSIPCO; (2013) pp. 1-5.

* cited by examiner

702
$V_{BIAS-1}$-$V_{BIAS-N}$
708
706
$V_{BIAS-C}$
710
$P_{OUT-1}$-$P_{OUT-N}$
506(1)-506(N)
HYBRID COUPLER 704
506(1)-506(N)

$V_{BIAS-1}$-$V_{BIAS-N}$
PA 700
$P_{OUT-1}$-$P_{OUT-N}$
506(1)-506(N)
506(1)-506(N)

REDUCING BEAMFORMING POWER CONSUMPTION IN A WIRELESS COMMUNICATIONS SYSTEM (WCS)

BACKGROUND

The disclosure relates generally to reducing power consumption for suppressing a sidelobe(s) associated with a radio frequency (RF) beam(s) in a wireless communications system (WCS), which can include a fifth generation (5G) system, a 5G new-radio (5G-NR) system, and/or a distributed communications system (DCS).

Wireless communication is rapidly growing, with ever-increasing demands for high-speed mobile data communication. As an example, local area wireless services (e.g., so-called "Wi-Fi" systems) and wide area wireless services are being deployed in many different types of areas (e.g., coffee shops, airports, libraries, etc.). Communications systems have been provided to transmit and/or distribute communications signals to wireless nodes called "clients," "client devices," or "wireless client devices," which must reside within the wireless range or "cell coverage area" in order to communicate with an access point device. Example applications where communications systems can be used to provide or enhance coverage for wireless services include public safety, cellular telephony, wireless local access networks (LANs), location tracking, and medical telemetry inside buildings and over campuses. One approach to deploying a communications system involves the use of radio nodes/base stations that transmit communications signals distributed over physical communications medium remote units forming RF antenna coverage areas, also referred to as "antenna coverage areas." The remote units each contain or are configured to couple to one or more antennas configured to support the desired frequency(ies) of the radio nodes to provide the antenna coverage areas. Antenna coverage areas can have a radius in a range from a few meters up to twenty meters, as an example. Another example of a communications system includes radio nodes, such as base stations, that form cell radio access networks, wherein the radio nodes are configured to transmit communications signals wirelessly directly to client devices without being distributed through intermediate remote units.

For example, FIG. 1 is an example of a WCS 100 that includes a radio node 102 configured to support one or more service providers 104(1)-104(N) as signal sources (also known as "carriers" or "service operators"—e.g., mobile network operators (MNOs)) and wireless client devices 106(1)-106(W). For example, the radio node 102 may be a base station (eNodeB) that includes modem functionality and is configured to distribute communications signal streams 108(1)-108(S) to the wireless client devices 106(1)-106(W) based on communications signals 110(1)-110(N) received from the service providers 104(1)-104(N). The communications signal streams 108(1)-108(S) of each respective service provider 104(1)-104(N) in their different spectrums are radiated through an antenna 112 to the wireless client devices 106(1)-106(W) in a communication range of the antenna 112. For example, the antenna 112 may be an antenna array. As another example, the radio node 102 in the WCS 100 in FIG. 1 can be a small cell radio access node ("small cell") that is configured to support the multiple service providers 104(1)-104(N) by distributing the communications signal streams 108(1)-108(S) for the multiple service providers 104(1)-104(N) based on respective communications signals 110(1)-110(N) received from a respective evolved packet core (EPC) network $CN_1$-$CN_N$ of the service providers 104(1)-104(N) through interface connections. The radio node 102 includes radio circuits 118(1)-118(N) for each service provider 104(1)-104(N) that are configured to create multiple simultaneous RF beams ("beams") 120(1)-120(N) for the communications signal streams 108(1)-108(S) to serve multiple wireless client devices 106(1)-106(W). For example, the multiple RF beams 120(1)-120(N) may support multiple-input, multiple-output (MIMO) communications.

The radio node 102 of the WCS 100 in FIG. 1 may be configured to support service providers 104(1)-104(N) that have a different frequency spectrum and do not share the spectrum. Thus, in this instance, the communications signals 110(1)-110(N) from the different service providers 104(1)-104(N) do not interfere with each other even if transmitted by the radio node 102 at the same time. The radio node 102 may also be configured as a shared spectrum communications system where the multiple service providers 104(1)-104(N) have a shared spectrum. In this regard, the capacity supported by the radio node 102 for the shared spectrum is split (i.e., shared) between the multiple service providers 104(1)-104(N) for providing services to the subscribers.

The radio node 102 in FIG. 1 can also be coupled to a distributed communications system (DCS), such as a distributed antenna system (DAS), such that the radio circuits 118(1)-118(N) remotely distribute the communications signals 110(1)-110(N) of the multiple service providers 104(1)-104(N) to remote units. The remote units can each include an antenna array that includes tens or even hundreds of antennas for concurrently radiating the communications signals 110(1)-110(N) to subscribers using spatial multiplexing. Herein, the spatial multiplexing is a scheme that takes advantage of the differences in RF channels between transmitting and receiving antennas to provide multiple independent streams between the transmitting and receiving antennas, thus increasing throughput by sending data over parallel streams. Accordingly, the remote units can be said to radiate the communications signals 110(1)-110(N) to subscribers based on a massive multiple-input multiple-output (M-MIMO) scheme.

The WCS 100 may be configured to operate as a 5G and/or a 5G-NR communications system. In this regard, the radio node 102 can function as a 5G or 5G-NR base station (a.k.a. eNodeB) to service the wireless client devices 106(1)-106(W). Notably, the 5G or 5G-NR wireless communications system may be implemented based on a millimeter-wave (mmWave) spectrum that can make the communications signals 110(1)-110(N) more susceptible to propagation loss and/or interference. As such, the radio node 102 must employ sophisticated power amplifiers to ensure each of the RF beams 120(1)-120(N) can be formed with sufficient power to satisfy such stringent regulatory and/or industrial requirements as adjacent channel power ratio (ACPR), adjacent channel leakage ratio (ACLR), and error vector magnitude (EVM). Moreover, it is equally desirable to ensure that the power amplifiers can operate with desirable efficiency to help reduce power consumption of the radio node 102.

SUMMARY

Embodiments disclosed herein include reducing beamforming power consumption in a wireless communications system (WCS). In the WCS, a wireless node(s) is configured to emit a data-bearing radio frequency (RF) beam(s) in an intended direction(s). Specifically, the wireless node(s) is configured to form the data-bearing RF beam(s) by preprocessing a data signal based on a beamforming codeword to generate multiple beamforming signals, amplifying the beamforming signals to certain output powers using multiple power amplifiers, and emitting the amplified beamforming signals simultaneously from multiple antenna elements. In embodiments disclosed herein, the wireless node(s) can be configured to suppress a sidelobe(s) associated with the data-bearing RF beam(s) without sacrificing efficiency and/or increasing power consumption of the power amplifiers. As a result, the wireless node(s) can achieve improved adjacent channel power ratio (ACPR), adjacent channel leakage ratio (ACLR), and/or error vector magnitude (EVM) concurrent to reducing beamforming power consumption.

One exemplary embodiment of the disclosure relates to a wireless node. The wireless node includes a power management circuit. The power management circuit is configured to generate a plurality of bias voltages based on a bias voltage control signal. The wireless node also includes a plurality of power amplifiers. Each of the plurality of power amplifiers is configured to amplify a respective one of a plurality of beamforming signals based on a respective one of the plurality of bias voltages. The wireless node also includes a beamforming processing circuit. The beamforming processing circuit is configured to generate the plurality of beamforming signals from a data signal based on a selected beamforming codeword. The wireless node also includes a codeword processing circuit. The codeword processing circuit is configured to receive a suggested beamforming codeword for forming the plurality of beamforming signals. The codeword processing circuit is also configured to determine the selected beamforming codeword and the bias voltage control signal based on the suggested beamforming codeword.

An additional exemplary embodiment of the disclosure relates to a method for reducing beamforming power consumption in a WCS. The method includes generating a plurality of bias voltages based on a bias voltage control signal. The method also includes amplifying a plurality of beamforming signals based on the plurality of bias voltages, respectively. The method also includes generating the plurality of beamforming signals from a data signal based on a selected beamforming codeword. The method also includes receiving a suggested beamforming codeword for forming the plurality of beamforming signals. The method also includes determining the selected beamforming codeword and the bias voltage control signal based on the suggested beamforming codeword.

An additional exemplary embodiment of the disclosure relates to a WCS. The WCS includes a distribution unit. The distribution unit is configured to distribute a plurality of data signals. The WCS also includes a plurality of wireless nodes coupled to the distribution unit. Each of the plurality of wireless nodes includes a power management circuit. The power management circuit is configured to generate a plurality of bias voltages based on a bias voltage control signal. Each of the plurality of wireless nodes also includes a plurality of power amplifiers. Each of the plurality of power amplifiers is configured to amplify a respective one of a plurality of beamforming signals based on a respective one of the plurality of bias voltages. Each of the plurality of wireless nodes also includes a beamforming processing circuit. The beamforming processing circuit is configured to generate the plurality of beamforming signals from a respective one of the plurality of data signals based on a selected beamforming codeword. Each of the plurality of wireless nodes also includes a codeword processing circuit. The codeword processing circuit is configured to receive a suggested beamforming codeword for forming the plurality of beamforming signals. The codeword processing circuit is also configured to determine the selected beamforming codeword and the bias voltage control signal based on the suggested beamforming codeword.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include reducing beamforming power consumption in a wireless communications system (WCS). In the WCS, a wireless node(s) is configured to emit a data-bearing radio frequency (RF) beam(s) in an intended direction(s). Specifically, the wireless node(s) is configured to form the data-bearing RF beam(s) by preprocessing a data signal based on a beamforming codeword to generate multiple beamforming signals, amplifying the beamforming signals to certain output powers using multiple power amplifiers, and emitting the amplified beamforming signals simultaneously from multiple antenna elements. In embodiments disclosed herein, the wireless node(s) can be configured to suppress a sidelobe(s) associated with the data-bearing RF beam(s) without sacrificing efficiency and/or increasing power consumption of the power amplifiers. As a result, the wireless node(s) can achieve improved adjacent channel power ratio (ACPR), adjacent channel leakage ratio (ACLR), and/or error vector magnitude (EVM) concurrent to reducing beamforming power consumption.

Figure 1:
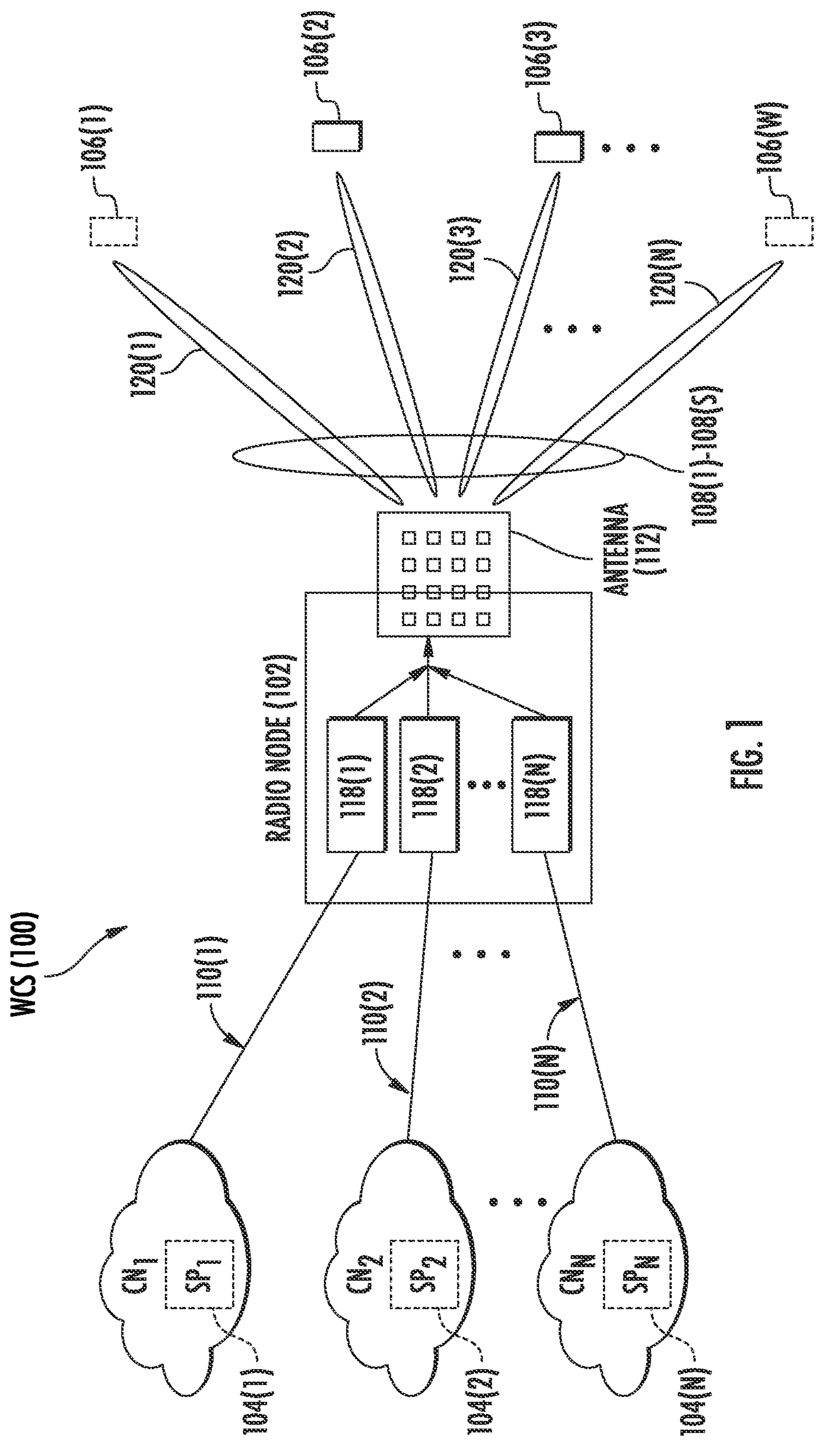
FIG. 1 is a schematic diagram of an exemplary wireless communications system (WCS), such as a distributed communications system (DCS), configured to distribute communications services to remote coverage areas.
Figure 2:
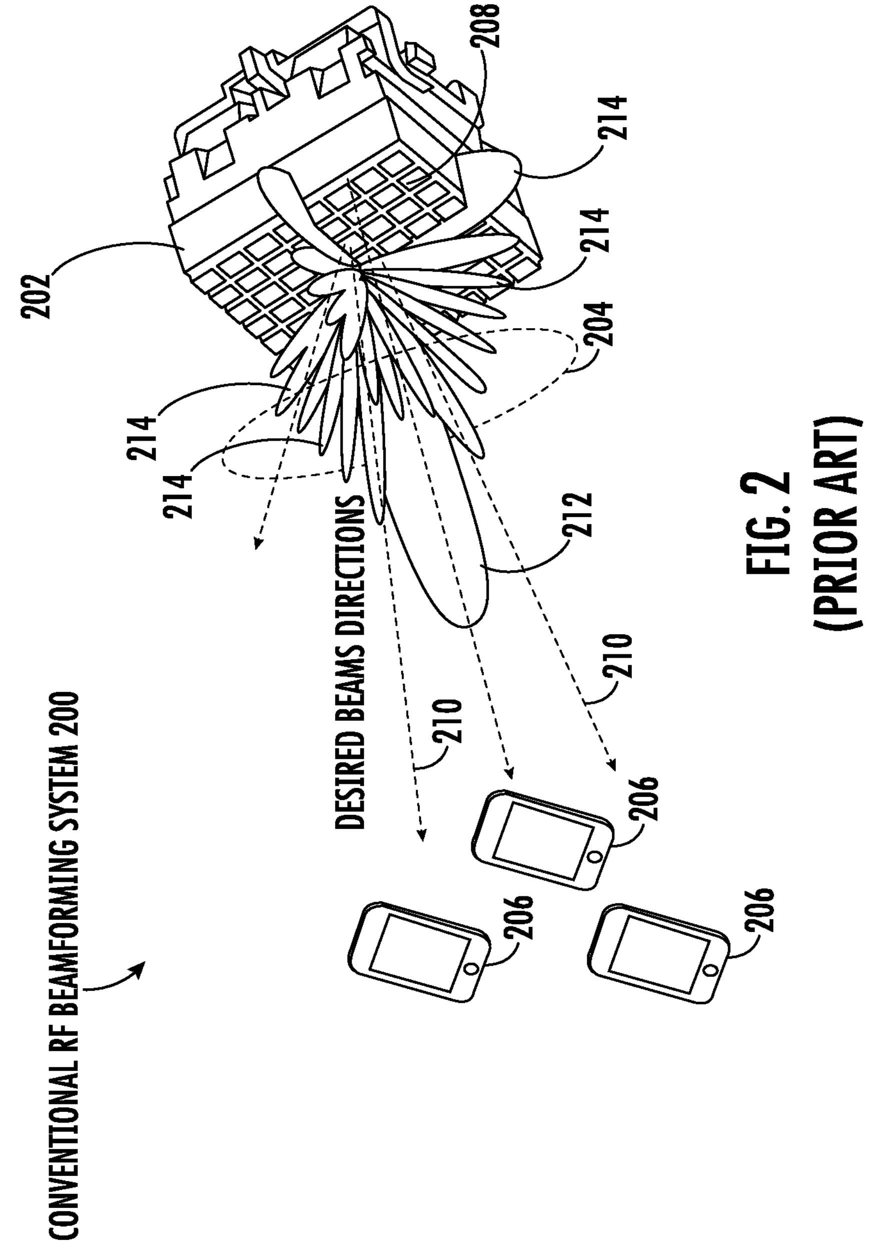
FIG. 2 is a schematic diagram of a conventional radio frequency (RF) beamforming system.
Figure 3:
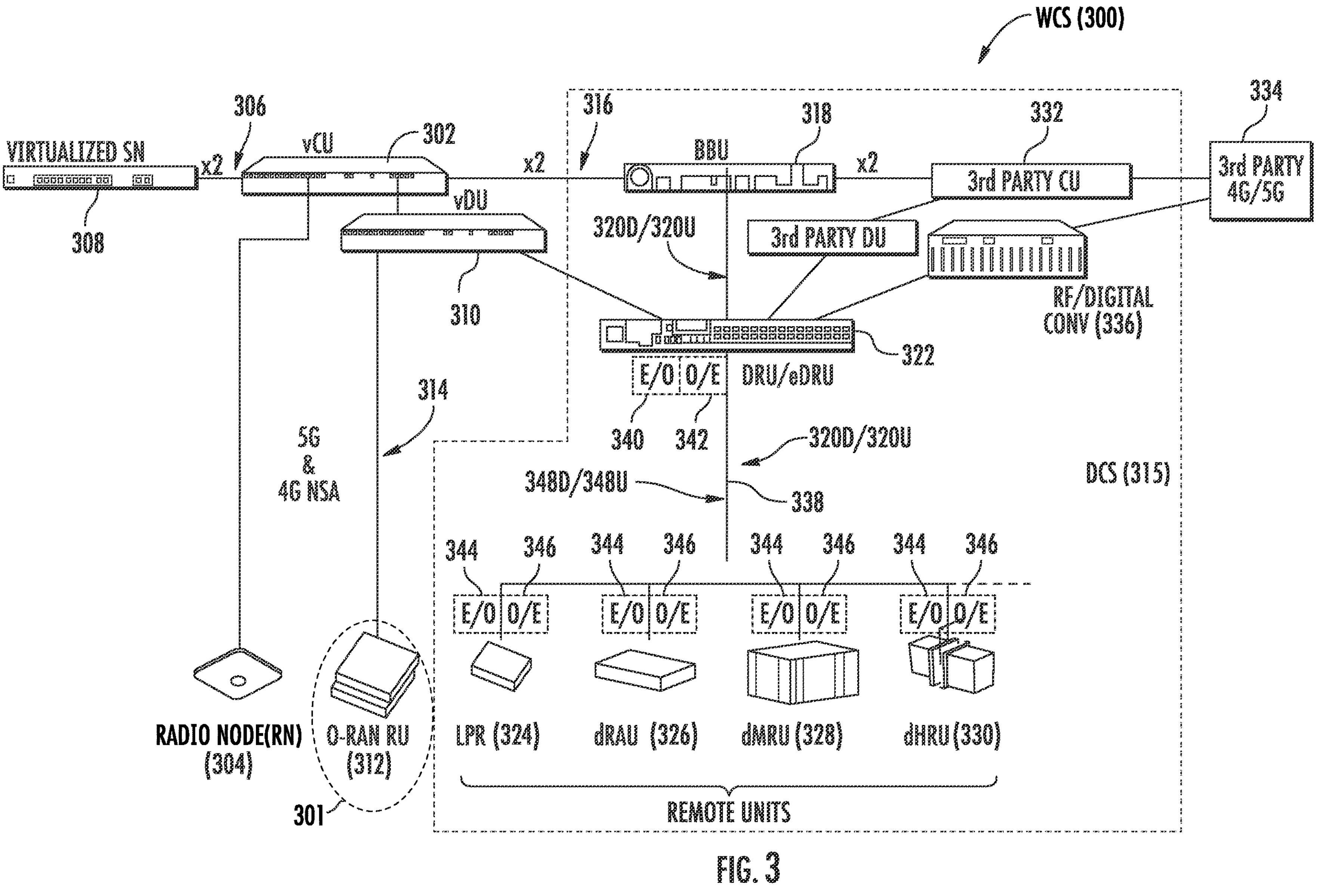
FIG. 3 is a schematic diagram of an exemplary WCS that can be configured to reduce beamforming power consumption according to various embodiments of the present disclosure.

Before discussing a wireless node of the present disclosure configured to reduce beamforming power consumption, starting at FIG. 3, a brief overview of a conventional beamforming system is first provided with reference to FIG. 2 to help explain some fundamental aspects related to RF beamforming.

In this regard, FIG. 2 is a schematic diagram of a conventional RF beamforming system 200 wherein an antenna array 202 emits an RF beam 204 toward one or more user devices 206. The antenna array 202 includes multiple antenna elements 208 that are typically separated from each other by a distance (e.g., 1%2 wavelength). The RF beam 204 emitted from the antenna elements 208 includes multiple beamforming signals (not shown), each of which is emitted by a respective one of the antenna elements 208. The beamforming signals are preprocessed based on a set of complex-valued coefficients, which is commonly known as a beamforming codeword. Specifically, the beamforming codeword is physically realized through phase and/or amplitude control applied at an input of the antenna elements 208 to thereby maximize an array gain in a desired beam direction(s) 210. By applying the set of complex-valued coefficients to the beamforming signals, the multiple simultaneously emitted beamforming signals can form the RF beam 204 described by gain, intensity, power, and/or electric/magnetic field values versus elevation and azimuth directions. In this regard, it can be said that the RF beam 204 is associated with, or defined by, a respective beamforming codeword. In other words, there is a one-to-one relationship between an RF beam and a beamforming codeword. Accordingly, a list of different beamforming codewords, often referred to as a beamforming codebook, can define multiple different RF beams.

Notably, the RF beam 204 often includes a main lobe 212, where radiated power is concentrated and close to a maximum radiated power, and one or more sidelobes 214 with lesser amounts of radiated power. Typically, a radiation direction of the main lobe 212 determines the desired beam direction(s) 210 of the RF beam 204, and a beamwidth of the RF beam 204 is defined by a set of the radiation directions 210 wherein the radiated power is not lower than 3 dB from the maximum radiated power.

The sidelobes 214 are residual radiation patterns in azimuth and elevation directions that are added to the main lobe 212. Notably, the sidelobes 214 can interfere with the main lobe 212 to reduce signal to interference and noise ratio (SINR) of the main lobe 212. The reduced SINR of the main lobe 212 often leads to a degradation in ACPR, ACLR, and/or EVM. As such, it is desirable to suppress the sidelobes 214 to help improve RF performance of the conventional RF beamforming system 200. Furthermore, it is desirable to suppress the sidelobes 214 while concurrently reducing power consumption in the conventional RF beamforming system 200.

In this regard, FIG. 3 is a schematic diagram of an exemplary WCS 300 that can be configured according to various embodiments of the present disclosure to reduce power consumption associated with suppressing the sidelobes 214 in FIG. 2. The WCS 300 supports both legacy 4G LTE, 4G/5G non-standalone (NSA), and 5G standalone communications systems. As shown in FIG. 3, a centralized services node 302 is provided and is configured to interface with a core network to exchange communications data and distribute the communications data as radio signals to various wireless nodes. In this example, the centralized services node 302 is configured to support distributed communications services to a radio node 304 (e.g., 5G or 5G-NR gNB). Despite that only one radio node 304 is shown in FIG. 3, it should be appreciated that the WCS 300 can be configured to include additional numbers of the radio node 304, as needed.

The functions of the centralized services node 302 can be virtualized through, for example, an x2 interface 306 to another services node 308. The centralized services node 302 can also include one or more internal radio nodes that are configured to be interfaced with a distribution unit (DU) 310 to distribute communications signals to one or more open radio access network (O-RAN) remote units (RUs) 312 that are configured to be communicatively coupled through an O-RAN interface 314. The O-RAN RUs 312 are each configured to communicate downlink and uplink communications signals in a respective coverage cell.

The centralized services node 302 can also be interfaced with a distributed communications system (DCS) 315 through an x2 interface 316. Specifically, the centralized services node 302 can be interfaced with a digital baseband unit (BBU) 318 that can provide a digital signal source to the centralized services node 302. The digital BBU 318 may be configured to provide a signal source to the centralized services node 302 to provide downlink communications signals 320D to a digital routing unit (DRU) 322 as part of a digital distributed antenna system (DAS). The DRU 322 is configured to split and distribute the downlink communications signals 320D to different types of remote units, including a low-power remote unit (LPR) 324, a radio antenna unit (dRAU) 326, a mid-power remote unit (dMRU) 328, and a high-power remote unit (dHRU) 330. The DRU 322 is also configured to combine uplink communications signals 320U received from the LPR 324, the dRAU 326, the dMRU 328, and the dHRU 330 and provide the combined uplink communications signals to the digital BBU 318. The digital BBU 318 is also configured to interface with a third-party central unit 332 and/or an analog source 334 through a radio frequency (RF)/digital converter 336.

The DRU 322 may be coupled to the LPR 324, the dRAU 326, the dMRU 328, and the dHRU 330 via an optical fiber-based communications medium 338. In this regard, the DRU 322 can include a respective electrical-to-optical (E/O) converter 340 and a respective optical-to-electrical (O/E)

converter 342. Likewise, each of the LPR 324, the dRAU 326, the dMRU 328, and the dHRU 330 can include a respective E/O converter 344 and a respective O/E converter 346.

The E/O converter 340 at the DRU 322 is configured to convert the downlink communications signals 320D into downlink optical communications signals 348D for distribution to the LPR 324, the dRAU 326, the dMRU 328, and the dHRU 330 via the optical fiber-based communications medium 338. The O/E converter 346 at each of the LPR 324, the dRAU 326, the dMRU 328, and the dHRU 330 is configured to convert the downlink optical communications signals 348D back to the downlink communications signals 320D. The E/O converter 344 at each of the LPR 324, the dRAU 326, the dMRU 328, and the dHRU 330 is configured to convert the uplink communications signals 320U into uplink optical communications signals 348U. The O/E converter 342 at the DRU 322 is configured to convert the uplink optical communications signals 348U back to the uplink communications signals 320U.

In context of the present disclosure, a wireless node refers generally to a wireless communication circuit including at least a processing circuit, a memory circuit, and an antenna circuit, and can be configured to process, transmit, and receive a wireless communications signal. In this regard, any of the radio node 304, the O-RAN RN 312, the LPR 324, the dRAU 326, the dMRU 328, and the dHRU 330 can function as a wireless node to reduce power consumption associated with RF beam sidelobe suppression based on embodiments disclosed herein.

Figure 4:
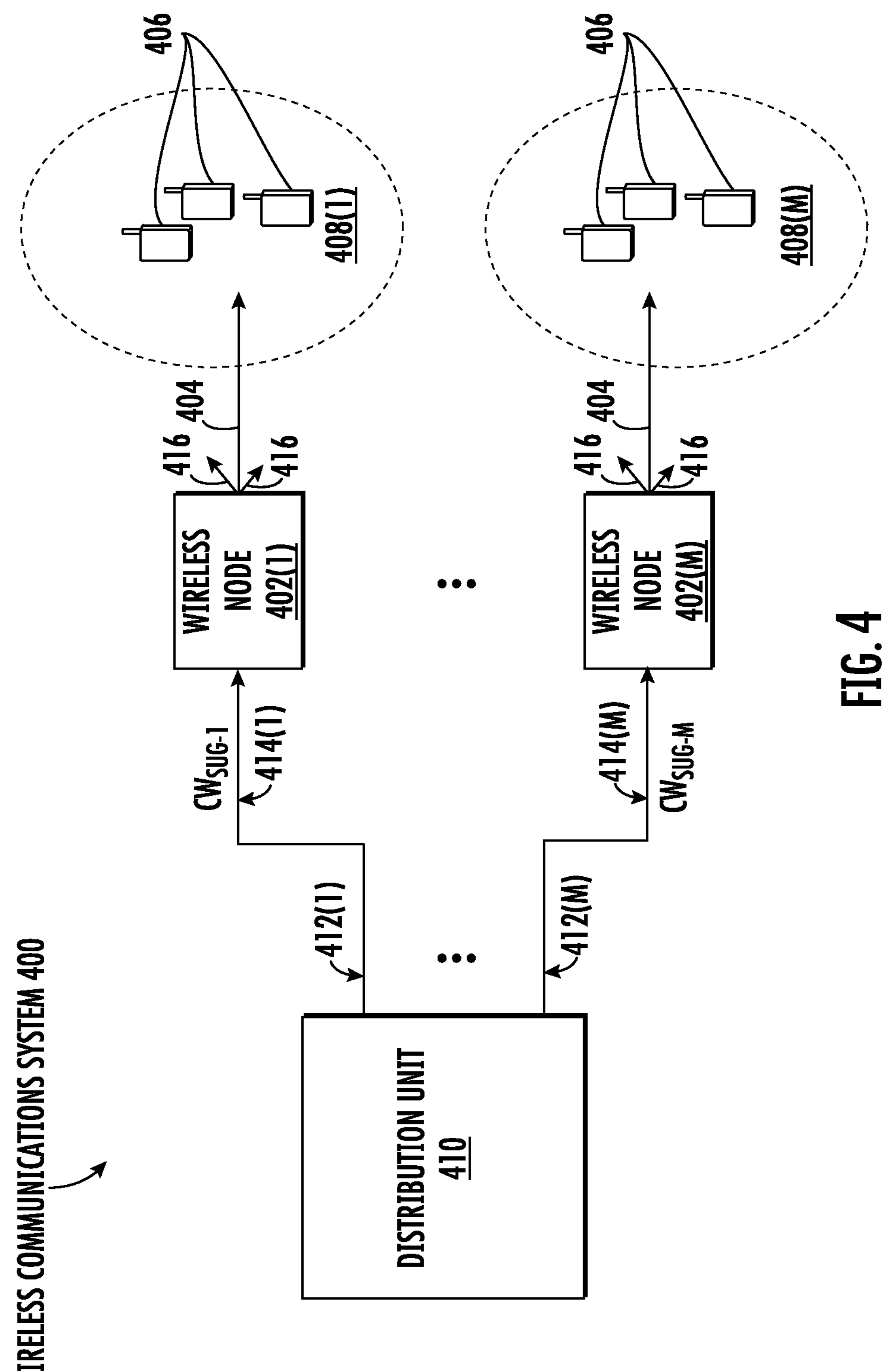
FIG. 4 is a schematic diagram of an exemplary WCS, which can be part of the WCS of FIG. 3, wherein multiple wireless nodes can each be configured according to embodiments of the present disclosure to reduce beamforming power consumption.

FIG. 4 is a schematic diagram of an exemplary WCS 400, which can be part of the WCS 300 of FIG. 3, configured according to an embodiment of the present disclosure to reduce beamforming power consumption in multiple wireless nodes 402(1)-402(M). Each of the wireless nodes 402(1)-402(M), which can be equated with the O-RAN RUs 312 in FIG. 3, as an example, is configured to radiate at least one respective RF beam 404 to service one or more wireless devices 406 in a respective one of multiple coverage areas 408(1)-408(M).

Herein, the WCS 400 includes a distribution unit 410, which can be functionally equivalent to the DU 310 in FIG. 3. In an embodiment, the distribution unit 410 is coupled to each of the wireless nodes 402(1)-402(M) via a respective one of multiple communication links 412(1)-412(M), such as optical fiber-based communication mediums. Accordingly, the distribution unit 410 can communicate multiple data signals 414(1)-414(M), which may be modulated based on a time-division multiplexing (TDD) scheme, to the wireless nodes 402(1)-402(M) via the communication links 412(1)-412(M), respectively. Each of the wireless nodes 402(1)-402(M), in turn, distributes a respective one of the data signals 414(1)-414(M) in the respective one of the coverage areas 408(1)-408(M) via the respective RF beam 404.

Herein, the distribution unit 410 is configured to control radiation direction and/or amplitude of the respective RF beam 404 emitted by each of the wireless nodes 402(1)-402(M) via a respective one of multiple suggested beamforming codewords $CW_{SUG-1}$-$CW_{SUG-M}$. The distribution unit 410 may transmit each of the suggested beamforming codewords $CW_{SUG-1}$-$CW_{SUG-M}$ either concurrent to or independent from transmitting the data signals 414(1)-414(M).

According to an embodiment of the present disclosure, the distribution unit 410 is configured to dynamically determine each of the suggested beamforming codewords $CW_{SUG-1}$-$CW_{SUG-M}$ by analyzing placements of the wireless devices 406, in conjunction with other parameters (e.g., coverage area size, user density, antenna tilt and orientation, etc.), to determine a respective radiation pattern (e.g., direction, gain, and/or beamwidth) of the respective RF beam 404 in each of the coverage areas 408(1)-408(M). In an embodiment, the distribution unit 410 may determine each of the suggested beamforming codewords $CW_{SUG-1}$-$CW_{SUG-M}$ for a given time interval, including but not limited to an orthogonal frequency division multiplex (OFDM) symbol, a TDD frame, or a TDD subframe. Accordingly, the distribution unit 410 may updated each of the suggested beamforming codewords $CW_{SUG-1}$-$CW_{SUG-M}$ periodically.

Alternative to determining each of the suggested beamforming codewords $CW_{SUG-1}$-$CW_{SUG-M}$ dynamically, the distribution unit 410 may also be configured to determine each of the suggested beamforming codewords $CW_{SUG-1}$-$CW_{SUG-M}$ statically. As an example, the distribution unit 410 can determine each of the suggested beamforming codewords $CW_{SUG-1}$-$CW_{SUG-M}$ statically when most of the wireless devices 406 in each of the coverage areas 408(1)-408(M) are mounted on fixed locations.

Figure 5:
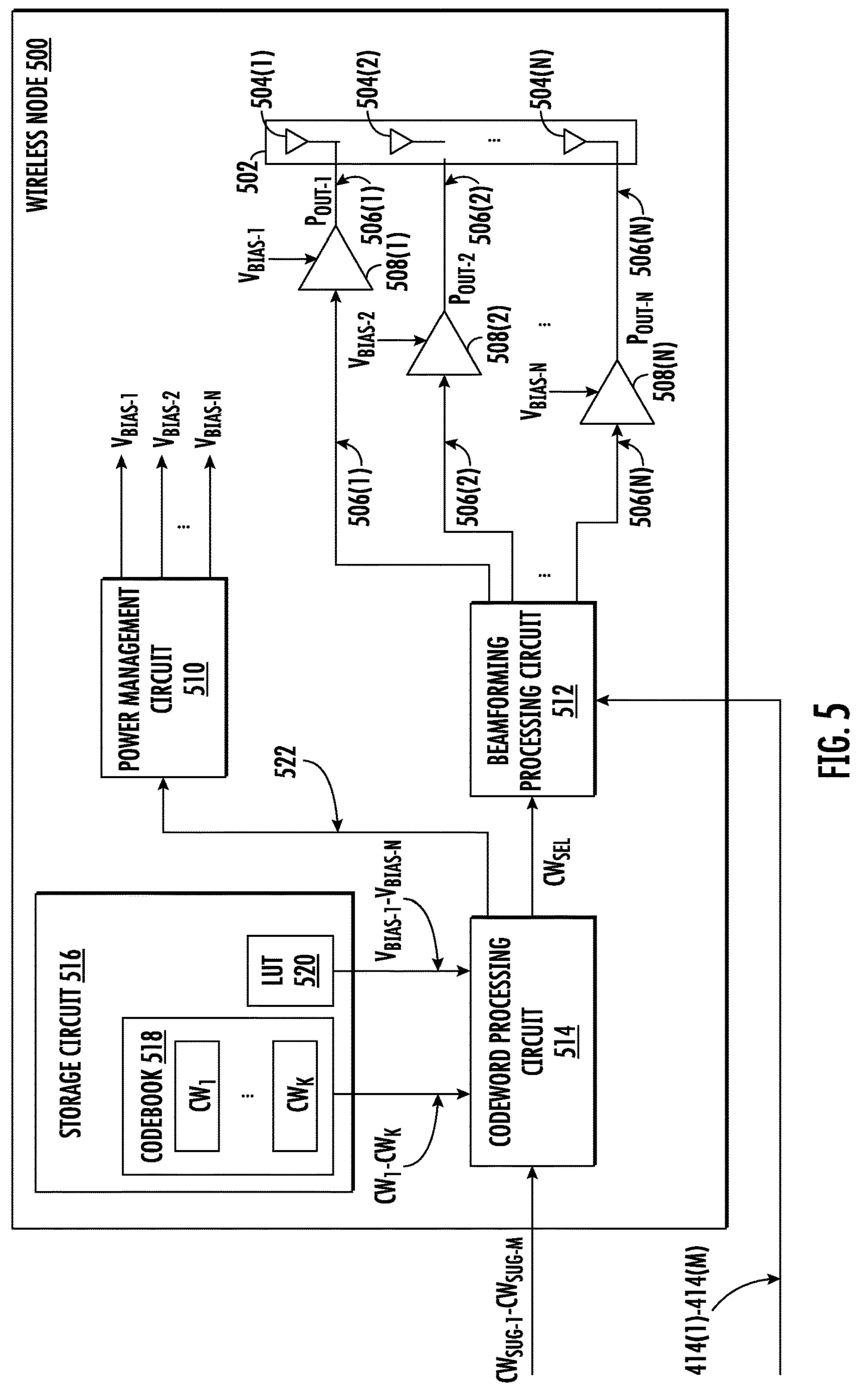
FIG. 5 is a schematic diagram providing an exemplary illustration of any of the wireless nodes in the WCS of FIG. 4 that can be configured according to embodiments of the present disclosure to reduce beamforming power consumption.

Like the RF beam 204 in FIG. 2, the RF beam 404 emitted from each of the wireless nodes 402(1)-402(M) can be associated with one or more sidelobes 416 that can cause the wireless nodes 402(1)-402(M) to suffer a degraded ACPR, ACLR, and/or EVM. As such, each of the wireless nodes 402(1)-402(M) must be configured to suppress the sidelobes 416 to ensure desirable RF performance of the WCS 400. In this regard, FIG. 5 is a schematic diagram of an exemplary wireless node 500, which can be provided as any of the wireless nodes 402(1)-402(M) in the WCS 400 of FIG. 4 to suppress the sidelobes 416 with reduced power consumption. Common elements between FIGS. 4 and 5 are shown therein with common element numbers and will not be re-described herein.

Herein, the wireless node 500 includes an antenna array 502 that includes multiple antenna elements 504(1)-504(N). Notably, although the antenna array 502 is illustrated herein as a linear array, it should be appreciated that the antenna array 502 can also be a matrix array or any other type of array. Furthermore, each of the antenna elements 504(1)-504(N) can be any type of radiating structure, including but not limited to a directional radiating structure. The antenna elements 504(1)-504(N) are configured to simultaneously emit multiple beamforming signals 506(1)-506(N), respectively, to thereby form the respective RF beam 404 (not shown).

The wireless node 500 includes multiple power amplifiers 508(1)-508(N). Each of the power amplifiers 508(1)-508(N) is coupled to a respective one of the antenna elements 504(1)-504(N) and configured to amplify a respective one of the beamforming signals 506(1)-506(N) to a respective one of multiple output power levels $P_{OUT-1}$-$P_{OUT-N}$ based on a respective one of multiple bias voltages $V_{BIAS-1}$-$V_{BIAS-N}$. The wireless node 500 includes a power management circuit 510. The power management circuit 510 is configured to generate and provide the bias voltages $V_{BIAS-1}$-$V_{BIAS-N}$ to the power amplifiers 508(1)-508(N), respectively. In a non-limiting example, each of the power amplifiers 508(1)-508(N) is configured to receive a respective one of the bias voltages $V_{BIAS-1}$-$V_{BIAS-N}$ at a collector node of an output stage, which are omitted herein for the sake of simplicity.

In one embodiment, the power management circuit 510 may be a buck-boost direct-current-direct-current (DC-DC) converter that can operate in buck and/or boost mode to generate each of the bias voltages $V_{BIAS-1}$-$V_{BIAS-N}$ at different voltage levels. In another embodiment, the power management circuit 510 may be a voltage source coupled to each of the power amplifiers 508(1)-508(N) via a respective voltage divider network (not shown). In this regard, the power management circuit 510 can generate a fixed voltage and rely on individual voltage divider networks to divide the fixed voltage into the bias voltages $V_{BIAS-1}$-$V_{BIAS-N}$ at different voltage levels. In another embodiment, the power management circuit 510 may be a buck-boost DC-DC converter and coupled to each of the power amplifiers 508(1)-508(N) via a respective voltage divider network (not shown). In this regard, the power management circuit 510 can not only generate each of the bias voltages $V_{BIAS-1}$-$V_{BIAS-N}$ at different voltage levels, but also use the voltage divider networks to provide finer granularities.

The wireless node 500 also includes a beamforming processing circuit 512, which can be an analog beamforming circuit, a digital beamforming circuit, or a hybrid beamforming circuit, as an example. The beamforming processing circuit 512 is configured to receive a respective one of the data signals 414(1)-414(M) from the distribution unit 410 in FIG. 4. Accordingly, the beamforming processing circuit 512 generates the beamforming signals 506(1)-506(N) from the respective one of the data signals 414(1)-414(M) based on a selected beamforming codeword $CW_{SEL}$. According to previous discussions in FIG. 2, the selected beamforming codeword $CW_{SEL}$ is a set of complex-valued coefficients whereby the beamforming processing circuit 512 can process the respective one of the data signals 414(1)-414(M) to generate the beamforming signals 506(1)-506(N) such that the respective RF beam 404 in FIG. 4 can be described by gain, intensity, power, and/or electric/magnetic field values versus elevation and azimuth directions when the beamforming signals 506(1)-506(N) are simultaneously emitted from the antenna array 502.

To help suppress the sidelobes 416 associated with the respective RF beam 404, as shown in FIG. 4, the wireless node 500 is configured to selectively reduce a subset of the output power levels $P_{OUT-1}$-$P_{OUT-N}$(a.k.a. "beamforming tapering") of a corresponding subset of the beamforming signals 506(1)-506(N) that is provided to a subset of the antenna elements 504(1)-504(N). In a non-limiting example, the wireless node 500 can selectively perform beamforming tapering on the subset of the antenna elements 504(1)-504(N) located away from a center of the antenna array 502. Studies have shown that, by selectively performing beamforming tapering on the subset of the antenna elements 504(1)-504(N), it is possible to substantially reduce the sidelobes 416 (e.g., 15 dB reduction) to thereby improve ACPR, ACLR, and/or EVM of the wireless node 500.

However, reducing the subset of the output power levels $P_{OUT-1}$-$P_{OUT-N}$ of the respective subset of the beamforming signals 506(1)-506(N) can reduce power amplifier efficiency 77 of a corresponding subset of the power amplifiers 508(1)-508(N) that amplify the respective subset of the beamforming signals 506(1)-506(N). Commonly, the power amplifier efficiency 77 can be described by equation (Eq. 1) below.

$$\eta = \text{Output Power}/\text{DC Power} \quad \text{(Eq. 1)}$$

For each of the power amplifiers 508(1)-508(N), the output power is equivalent to a respective one of the output power levels $P_{OUT-1}$-$P_{OUT-N}$ and the DC power is proportionally related to a respective one of the bias voltages $V_{BIAS-1}$-$V_{BIAS-N}$. It is clear from equation (Eq. 1) that, if the DC power is held constant, the power amplifier efficiency 7 will decrease as the output power decreases. Moreover, for certain types (e.g., class A) of the power amplifiers 508(1)-508(N), a reduction in the output power levels $P_{OUT-1}$-$P_{OUT-N}$ will not reduce the maximum current in the power amplifiers 508(1)-508(N). As a result, the power amplifiers 508(1)-508(N) will consume more energy than needed.

In this regard, to further reduce power consumption during beamforming tapering, the wireless node 500 is further configured to reduce a subset of the bias voltages $V_{BIAS-1}$-$V_{BIAS-N}$ supplied to the corresponding subset of the power amplifiers 508(1)-508(N). Understandably, a reduction in any of the bias voltages $V_{BIAS-1}$-$V_{BIAS-N}$ will result in a reduction in the corresponding DC power, thus leading to an increase in the power amplifier efficiency 11 according to equation (Eq. 1).

In an embodiment, the wireless node 500 further includes a codeword processing circuit 514 and a storage circuit 516. In a non-limiting example, the codeword processing circuit 514 can be a field-programmable gate array (FPGA) or an application-specific integrated circuit (ASIC) and the storage circuit 516 can be a flash memory storage circuit or a solid-state disk (SSD). In an embodiment, the storage circuit 516 may be preconfigured to store a codebook 518 and a lookup table (LUT) 520. In addition, the codebook 518 may store a set of beamforming codewords $CW_1$-$CW_K$ and the LUT 520 may be preprogrammed to correlate each of the beamforming codewords $CW_1$-$CW_K$ with a respective set of the bias voltages $V_{BIAS-1}$-$V_{BIAS-N}$.

Herein, the codeword processing circuit 514 receives the respective one of the suggested beamforming codewords $CW_{SUG-1}$-$CW_{SUG-M}$ from the distribution unit 410 in FIG. 4. Accordingly, the codeword processing circuit 514 can determine the selected beamforming codeword $CW_{SEL}$ among the beamforming codewords $CW_1$-$CW_K$ based on the respective one of the suggested beamforming codewords $CW_{SUG-1}$-$CW_{SUG-M}$.

In an embodiment, the codeword processing circuit 514 examines the respective one of the suggested beamforming codewords $CW_{SUG-1}$-$CW_{SUG-M}$ to determine whether the wireless node 500 can form the respective RF beam 404 based on the respective one of the suggested beamforming codewords $CW_{SUG-1}$-$CW_{SUG-M}$. If the codeword processing circuit 514 determines that the wireless node 500 can indeed form the respective RF beam 404 based on the respective one of the suggested beamforming codewords $CW_{SUG-1}$-$CW_{SUG-M}$, the codeword processing circuit 514 will pass the respective one of the suggested beamforming codewords $CW_{SUG-1}$-$CW_{SUG-M}$ to the beamforming processing circuit 512 as the selected beamforming codeword $CW_{SEL}$.

In contrast, if the codeword processing circuit 514 determines that the wireless node 500 is unable to form the respective RF beam 404 based on the respective one of the suggested beamforming codewords $CW_{SUG-1}$-$CW_{SUG-M}$ due to, for example, hardware and/or software limitations (a.k.a. "preconfigured capability"), the codeword processing circuit 514 will in turn select one of the beamforming codewords $CW_1$-$CW_K$ as the selected beamforming codeword $CW_{SEL}$. More specifically, the codeword processing circuit 514 will select one of the beamforming codewords $CW_1$-$CW_K$ that can cause the wireless node 500 to form the respective RF beam 404 having the closest characteristics as the respective RF beam 404 intended to be formed by the respective one of the suggested beamforming codewords $CW_{SUG-1}$-$CW_{SUG-M}$. For example, the respective one of the suggested beamforming codewords $CW_{SUG-1}$-$CW_{SUG-M}$ is intended to form the respective RF beam 404 to a 3.5° azimuth angle from boresight. However, the closest azimuth angle that can be achieved by hardware/software of the wireless node 500 is only 5°. As such, the codeword processing circuit 514 will then select one of the beamforming codewords $CW_1$-$CW_K$ in the codebook 518 that can cause the wireless node 500 to form the respective RF beam 404 to the 5° azimuth angle, as opposed to using the respective one of the suggested beamforming codewords $CW_{SUG-1}$-$CW_{SUG-M}$.

Regardless of how the codeword processing circuit 514 determines the selected beamforming codeword $CW_{SEL}$, the selected beamforming codeword $CW_{SEL}$ will nevertheless use one of the beamforming codewords $CW_1$-$CW_K$ in the codebook 518. In this regard, the codeword processing circuit 514 will be able to retrieve a respective set of the bias voltages $V_{BIAS-1}$-$V_{BIAS-M}$ from the LUT 520 based on the selected beamforming codeword $CW_{SEL}$ and provide the respective set of the bias voltages $V_{BIAS-1}$-$V_{BIAS-M}$ to the power management circuit 510 in a bias voltage control signal 522. Should it be necessary for the wireless node 500 to perform beamforming tapering, the respective set of the bias voltages $V_{BIAS-1}$-$V_{BIAS-M}$ would cause the some of the power amplifiers 508(1)-508(N) to reduce respective DC power to thereby achieve improved power amplifier efficiency and reduced power consumption.

Figure 6:
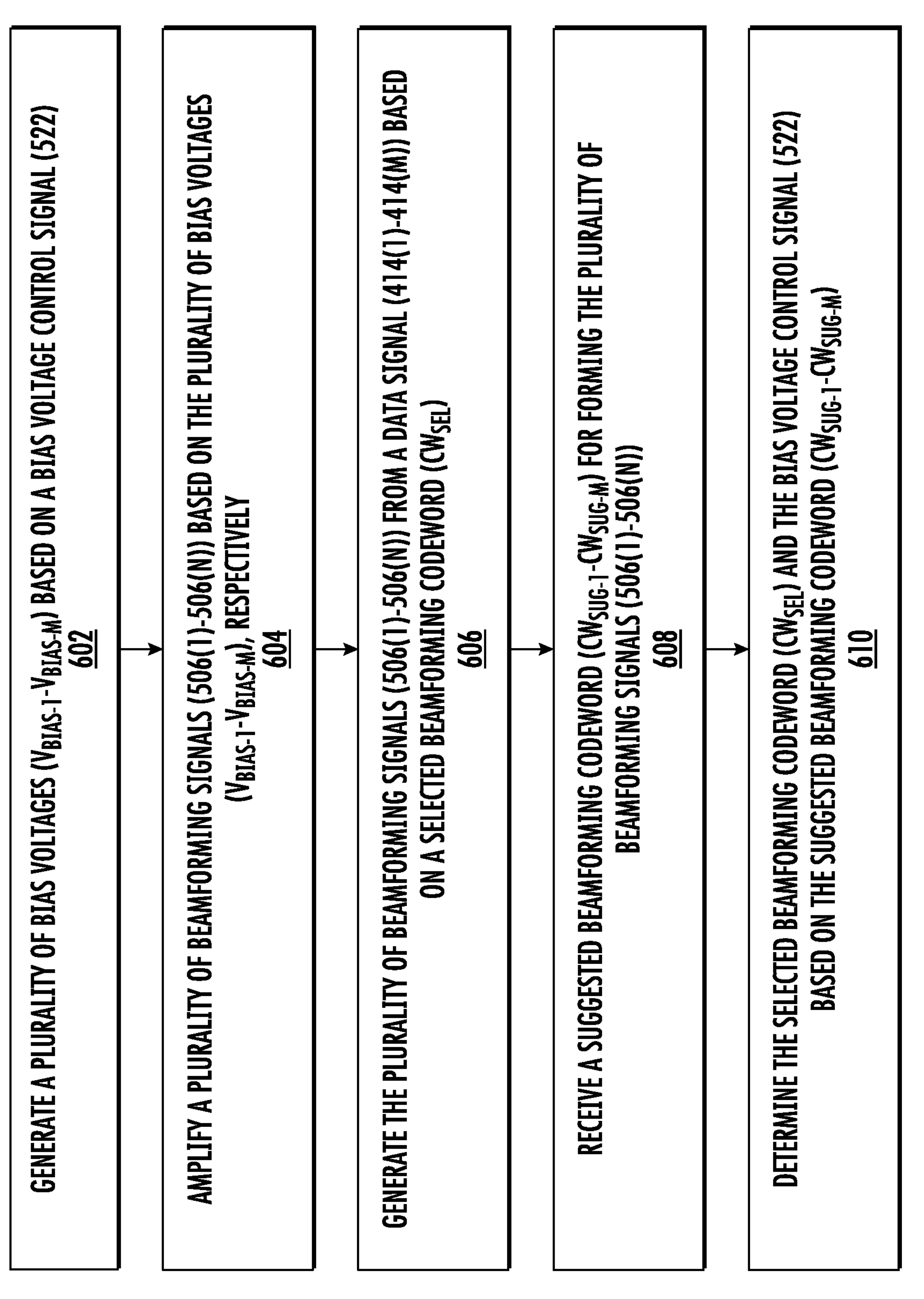
FIG. 6 is a flowchart of an exemplary process that can be employed by the wireless node of FIG. 5 to reduce beamforming power consumption.

The wireless node 500 can be configured to reduce beamforming power consumption based on a process. In this regard, FIG. 6 is a flowchart of an exemplary process 600 whereby the wireless node 500 of FIG. 5 can reduce beamforming power consumption.

Herein, the power management circuit 510 is configured to generate the bias voltages $V_{BIAS-1}$-$V_{BIAS-N}$ based on the bias voltage control signal 522 (block 602). The power amplifiers 508(1)-508(N) are configured to amplify the beamforming signals 506(1)-506(N) based on the bias voltages $V_{BIAS-1}$-$V_{BIAS-M}$, respectively (block 604). The beamforming processing circuit 512 is configured to generate the beamforming signals 506(1)-506(N) from a respective one of the data signals 414(1)-414(M) based on the selected beamforming codeword $CW_{SEL}$ (block 606). The codeword processing circuit 514 is configured to receive the respective one of the suggested beamforming codewords $CW_{SUG-1}$-$CW_{SUG-M}$ for forming the beamforming signals 506(1)-506(N) (block 608). Accordingly, the codeword processing circuit 514 determines the selected beamforming codeword $CW_{SEL}$ and the bias voltage control signal 522 based on the respective one of the suggested beamforming codewords $CW_{SUG-1}$-$CW_{SUG-M}$ (block 610).

Figure 7B:
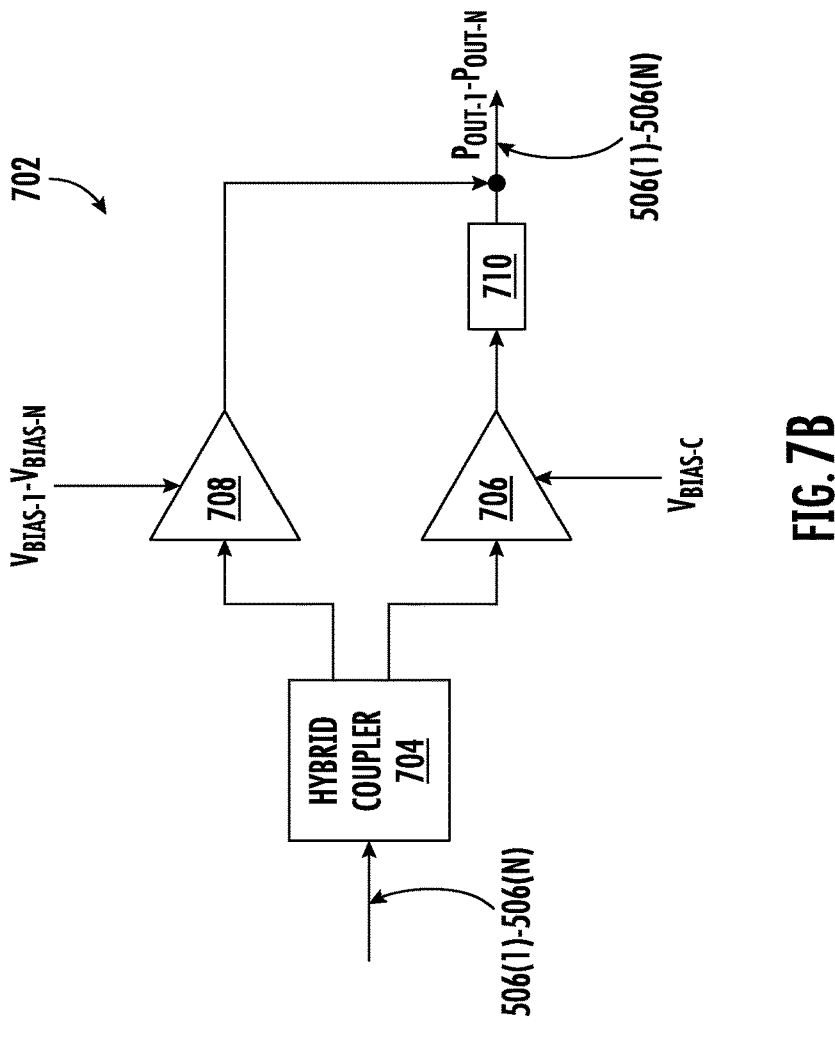
FIGS. 7A and 7B are schematic diagrams providing exemplary illustrations of various types of power amplifiers that can be provided in the wireless node of FIG. 5.
Figure 7A:
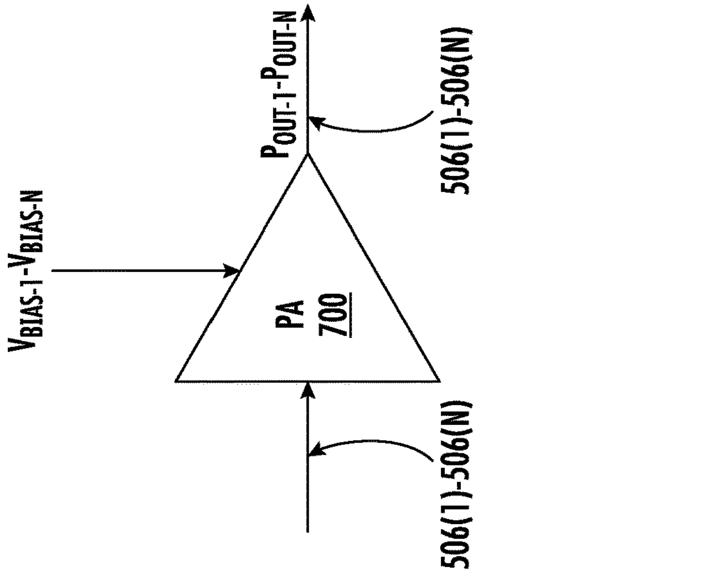

With reference back to FIG. 5, each of the power amplifiers 508(1)-508(N) can either be a low-power amplifier or a high-power amplifier. FIGS. 7A and 7B are schematic diagrams providing exemplary illustrations of various types of the power amplifiers 508(1)-508(N) in the wireless node 500 of FIG. 5. Common elements between FIGS. 5, 7A, and 7B are shown therein with common element numbers and will not be re-described herein.

FIG. 7A is a schematic diagram of an exemplary low-power amplifier 700 that can be provided in the wireless node 500 of FIG. 5 as each of the power amplifiers 508(1)-508(N). In a non-limiting example, the low-power amplifier 700 can be a class AB power amplifier. In this regard, when performing beamforming tapering, the power management circuit 510 can reduce any of the bias voltages $V_{BIAS-1}$-$V_{BIAS-M}$ received by the low-power amplifier 700.

FIG. 7B is a schematic diagram of an exemplary high-power amplifier 702 that can be provided in the wireless node 500 of FIG. 5 as each of the power amplifiers 508(1)-508(N). In a non-limiting example, the high-power amplifier 702 can be a Doherty power amplifier that includes a hybrid coupler 704, a carrier amplifier 706, a peaking amplifier 708, and an inversion network 710. The carrier amplifier 706 and the peaking amplifier 708 are configured to collectively amplify any of the beamforming signals 506(1)-506(N) to a respective one of the output power levels $P_{OUT-1}$-$P_{OUT-N}$. Specifically, the carrier amplifier 706 is always active to amplify any of the beamforming signals 506(1)-506(N) based on a respective bias voltage $V_{BIAS-C}$. The peaking amplifier 708, on the other hand, is only activated when the respective one of the output power levels $P_{OUT-1}$-$P_{OUT-N}$ is above a predefined threshold. When activated, the peaking amplifier 708 will operate based on a respective one of the bias voltages $V_{BIAS-1}$-$V_{BIAS-M}$. As such, when performing beamforming tapering, the power management circuit 510 can reduce any of the bias voltages $V_{BIAS-1}$-$V_{BIAS-M}$ received by the peaking amplifier 708.

As mentioned earlier, the data signals 414(1)-414(M) may be modulated based on a TDD scheme. In this regard, FIG. 8 is a graphic diagram providing an exemplary illustration as to how the wireless node 500 of FIG. 5 can reduce beamforming power consumption based on the TDD scheme.

Figure 8:
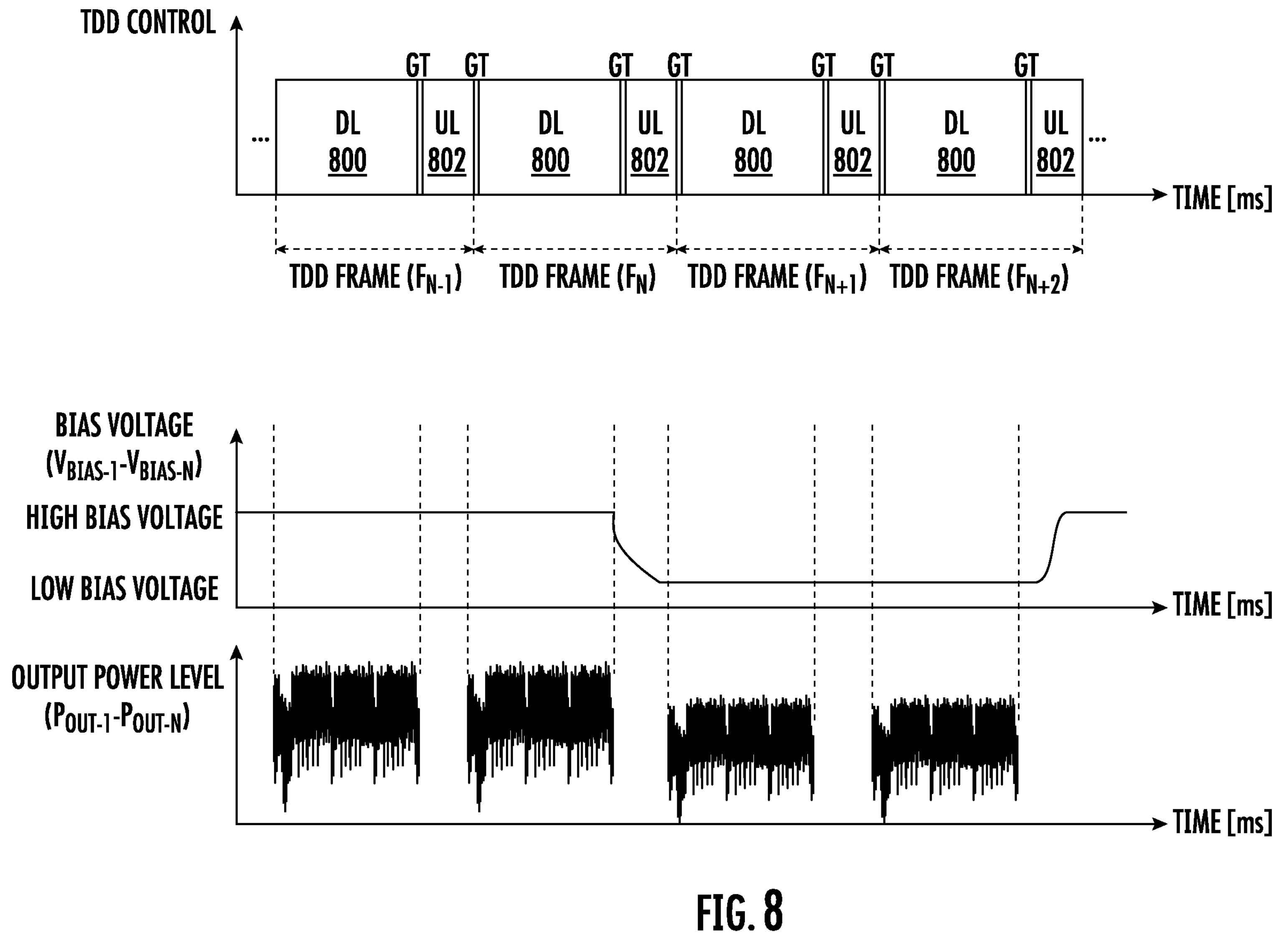
FIG. 8 is a graphic diagram providing an exemplary illustration as to how the wireless node of FIG. 5 can reduce beamforming power consumption based on a time-division multiplexing (TDD) scheme.

As a non-limiting example, FIG. 8 illustrates how the power management circuit 510 in FIG. 5 can dynamically change any of the bias voltages $V_{BIAS-1}$-$V_{BIAS-N}$ during multiple consecutive TDD frames $F_{N-1}$, $F_N$, $F_{N+1}$, $F_{N+2}$. Each of the TDD frames $F_{N-1}$, $F_N$, $F_{N+1}$, $F_{N+2}$ includes a downlink subframe 800 and an uplink subframe 802 that are separated by a guard time GT.

In this example, none of the output power levels $P_{OUT-1}$-$P_{OUT-N}$ will change in between the TDD frames $F_{N-1}$ and $F_N$ and in between the TDD frames $F_{N+1}$ and $F_{N+2}$. Accordingly, the power management circuit 510 will not decrease any of the bias voltages $V_{BIAS-1}$-$V_{BIAS-N}$ between TDD frames $S_{N-1}$ and $S_N$ and between TDD frames $S_{N+1}$ and $S_{N+2}$.

In this example, one of the output power levels $P_{OUT-1}$-$P_{OUT-N}$ is set to decrease in between the TDD frames $F_N$ and $F_{N+1}$. Accordingly, the power management circuit 510 will decrease a corresponding one of the bias voltages $V_{BIAS-1}$-$V_{BIAS-N}$ during the uplink subframe 802 in the TDD frame $F_N$. By reducing the corresponding one of the bias voltages $V_{BIAS-1}$-$V_{BIAS-N}$ during the uplink subframe 802, the power management circuit 510 will have sufficient time to transition the corresponding one of the bias voltages $V_{BIAS-1}$-$V_{BIAS-N}$ from a high bias voltage to a low bias voltage by a start of the downlink subframe 800 in the TDD frame $F_{N+1}$.

Figure 9:
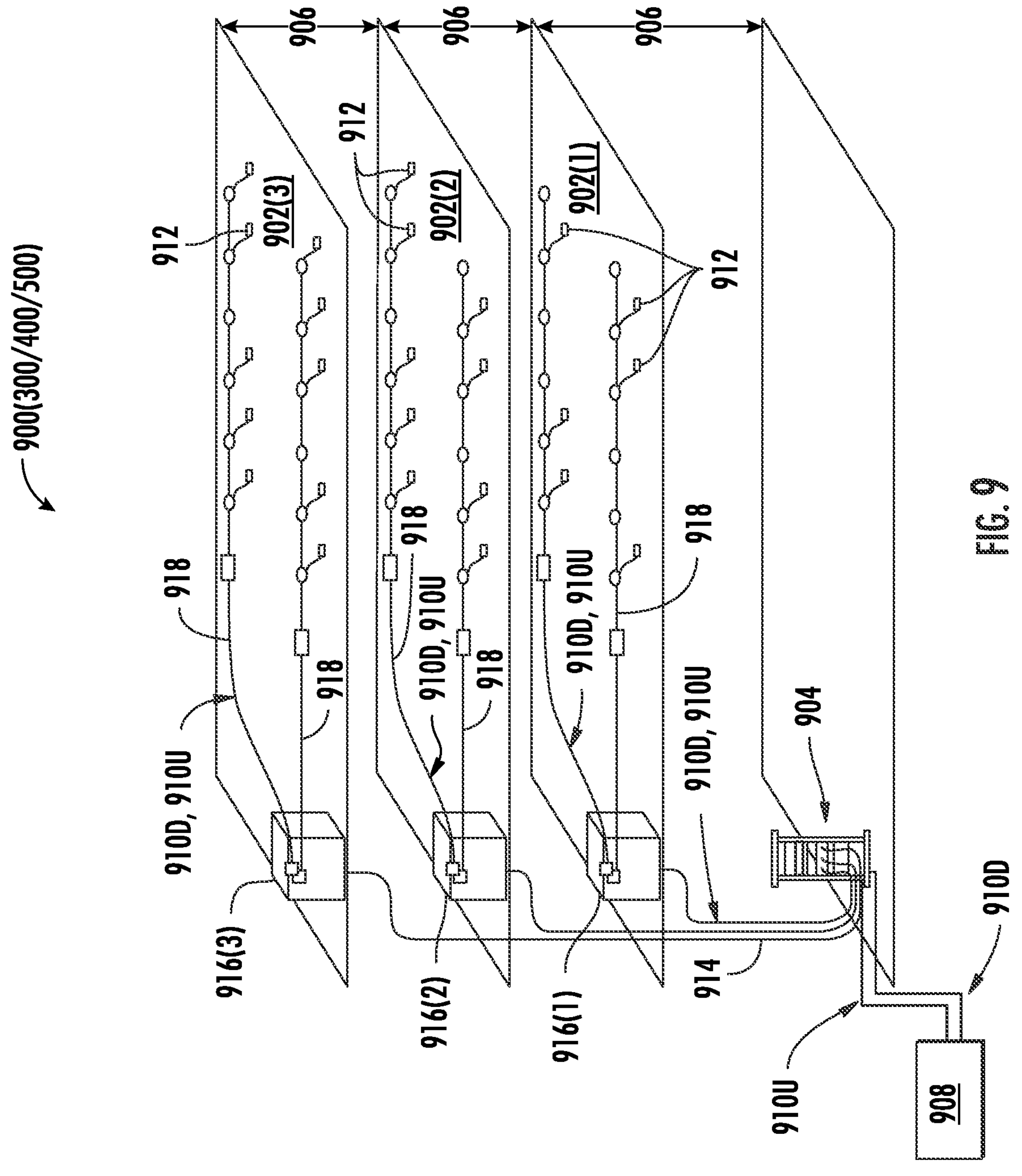
FIG. 9 is a partial schematic cut-away diagram of an exemplary building infrastructure in a WCS, such as the WCS of FIG. 4 that includes the wireless node of FIG. 5 to reduce beamforming power consumption.

The WCS 300 of FIG. 3 and the WCS 400 of FIG. 4, which can include the wireless node 500 in FIG. 5, can be provided in an indoor environment as illustrated in FIG. 9. FIG. 9 is a partial schematic cut-away diagram of an exemplary building infrastructure 900 in a WCS, such as the WCS 300 of FIG. 3 and the WCS 400 of FIG. 4 that includes the wireless node 500 of FIG. 5 to reduce beamforming power consumption. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. The downlink communications signals

910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
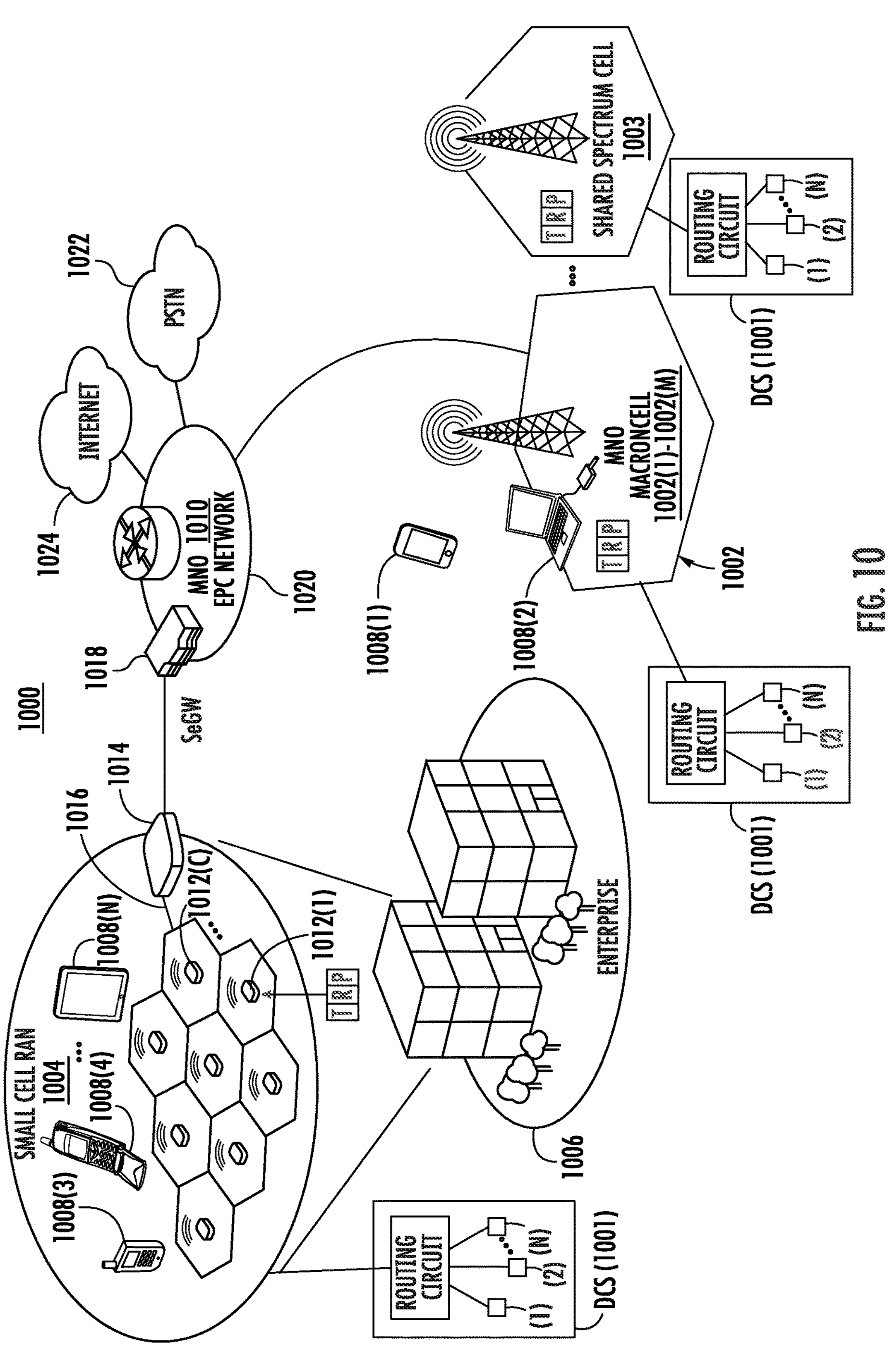
FIG. 10 is a schematic diagram of an exemplary mobile telecommunications environment that can include the WCS of FIG. 4 that includes the wireless node of FIG. 5 to reduce beamforming power consumption.

The WCS 300 of FIG. 3, the WCS 400 of FIG. 4, and the wireless node 500 of FIG. 5, configured to reduce beamforming power consumption, can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum WCSs 1001 supporting coordination of distribution of shared spectrum from multiple service providers to remote units to be distributed to subscriber devices. The shared spectrum WCSs 1001 can include the WCS 300 of FIG. 3 and the WCS 400 of FIG. 4 that includes the wireless node 500 of FIG. 5, as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between a user mobile communications device 1008(1)-1008(N) to a mobile network operator (MNO) 1010. A serving RAN for the user mobile communications devices 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas the user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO, such as CBRS for example, and thus may service user mobile communications devices 1008(1)-1008(N) independent of a particular MNO. For example, the shared spectrum cell 1003 may be operated by a third party that is not an MNO and wherein the shared spectrum cell 1003 supports CBRS. Also, as shown in FIG. 10, the MNO macrocell 1002, the shared spectrum cell 1003, and/or the small cell RAN 1004 can interface with a shared spectrum WCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that a user mobile communications device 1008(3)-1008(N) may be able to be in communications range of two or more of the MNO macrocell 1002, the shared spectrum cell 1003, and the small cell RAN 1004 depending on the location of the user mobile communications devices 1008(3)-1008(N).

In FIG. 10, the mobile telecommunications environment 1000 in this example is arranged as an LTE system as described by the Third Generation Partnership Project (3GPP) as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise environment 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g., evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
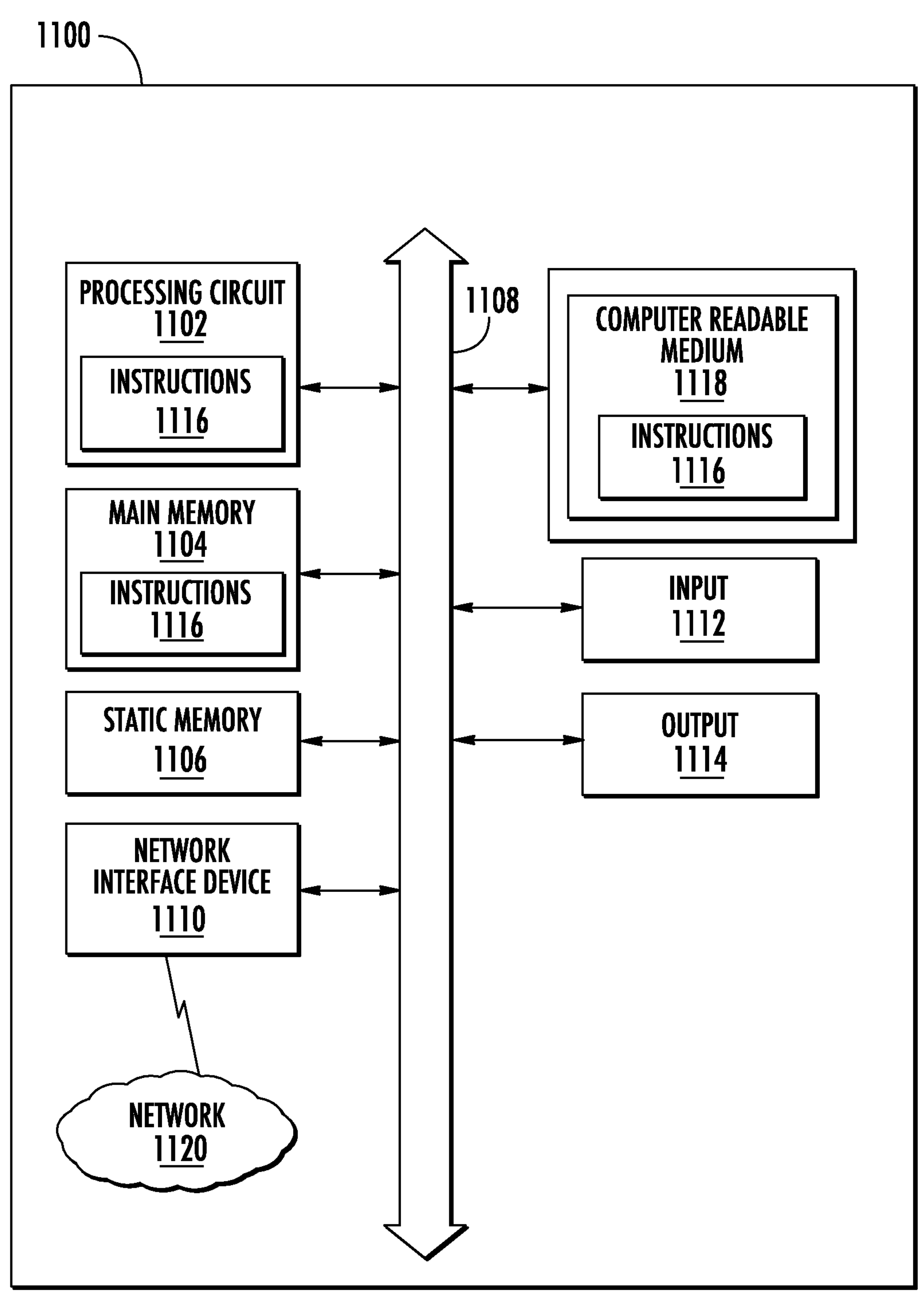
FIG. 11 is a schematic diagram of a representation of an exemplary computer system that can be included in or interfaced with any of the components in the WCS of FIG. 4 and the wireless node in FIG. 5 to reduce beamforming power consumption, wherein the exemplary computer system is configured to execute instructions from an exemplary computer-readable medium.

Any of the circuits in the WCS 300 of FIG. 3, the WCS 400 of FIG. 4, and the wireless node 500 of FIG. 5, such as the codeword processing circuit 514 and/or the beamforming processing circuit 512, can include a computer system 1100, such as that shown in FIG. 11, to carry out their functions and operations. With reference to FIG. 11, the computer system 1100 includes a set of instructions for causing the multi-operator radio node component(s) to provide its designed functionality, and the circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1100 in this embodiment includes a processing circuit or processor 1102, a main memory 1104 (e.g., read-only memory (ROM), flash memory, dynamic random access memory (DRAM) such as synchronous DRAM (SDRAM), etc.), and a static memory 1106 (e.g., flash memory, static random access memory (SRAM), etc.), which may communicate with each other via a data bus 1108. Alternatively, the processing circuit 1102 may be connected to the main memory 1104 and/or static memory 1106 directly or via some other connectivity means. The processing circuit 1102 may be a controller, and the main memory 1104 or static memory 1106 may be any type of memory.

The processing circuit 1102 represents one or more general-purpose processing circuits such as a microprocessor, central processing unit, or the like. More particularly, the processing circuit 1102 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1102 is configured to execute processing logic in instructions 1116 for performing the operations and steps discussed herein.

The computer system 1100 may further include a network interface device 1110. The computer system 1100 also may or may not include an input 1112 to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processing circuit 1102 during execution thereof by the computer system 1100, the main memory 1104 and the processing circuit 1102 also constituting the computer-readable medium 1118. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A wireless node, comprising:

a power management circuit configured to generate a plurality of bias voltages based on a bias voltage control signal; a plurality of power amplifiers each configured to amplify a respective one of a plurality of beamforming signals based on a respective one of the plurality of bias voltages;

a beamforming processing circuit configured to generate the plurality of beamforming signals from a data signal based on a selected beamforming codeword, wherein the beamforming processing circuit is one of an analog beamforming circuit, a digital beamforming circuit, and a hybrid beamforming circuit; and a codeword processing circuit configured to:

receive a suggested beamforming codeword for forming the plurality of beamforming signals; and determine the selected beamforming codeword and the bias voltage control signal based on the suggested beamforming codeword.

2. The wireless node of claim 1, wherein the codeword processing circuit is further configured to:

determine the selected beamforming codeword to be identical to the suggested beamforming codeword in response to the suggested beamforming codeword being within a preconfigured capability of the wireless node; and determine the selected beamforming codeword to be one of a plurality of predefined beamforming codewords that is closest to the suggested beamforming codeword in response to the suggested beamforming codeword being beyond the preconfigured capability of the wireless node.

3. The wireless node of claim 1, wherein the codeword processing circuit is further configured to:

determine from the suggested beamforming codeword that each of a subset of the plurality of power amplifiers is required to amplify a respective one of a subset of the plurality of beamforming signals to a respective reduced power level; and generate the bias voltage control signal to cause the power management circuit to reduce a subset of the plurality of bias voltages received by the subset of the plurality of power amplifiers, respectively.

4. The wireless node of claim 3, wherein:

each of the plurality of power amplifiers is a class AB power amplifier configured to amplify the respective one of the plurality of beamforming signals; and the power management circuit is further configured to reduce the subset of the plurality of bias voltages received by the subset of the plurality of power amplifiers.

5. The wireless node of claim 3, wherein:

each of the plurality of power amplifiers is a Doherty power amplifier comprising a carrier amplifier and a peaking amplifier configured to collectively amplify the respective one of the plurality of beamforming signals; and the power management circuit is further configured to reduce the subset of the plurality of bias voltages received by the peaking amplifier in the subset of the plurality of power amplifiers.

6. The wireless node of claim 3, wherein:

each of the plurality of beamforming signals is modulated into a plurality of time-division multiplexing (TDD) frames each comprising a downlink subframe and an uplink subframe separated by a guard time; and the power management circuit is further configured to reduce the subset of the plurality of bias voltages during the uplink subframe in a respective one of the plurality of TDD frames associated with a respective one of the subset of the plurality of beamforming signals.

7. The wireless node of claim 1, further comprising an antenna array that includes multiple antenna elements, each antenna element coupled to a respective one of the plurality of power amplifiers, and the antenna elements configured to simultaneously emit the plurality of beamforming signals to thereby form a radio frequency (RF) beam.

8. A method for reducing beamforming power consumption in a wireless communications system (WCS), comprising:

generating a plurality of bias voltages based on a bias voltage control signal;

amplifying a plurality of beamforming signals based on the plurality of bias voltages, respectively;

generating the plurality of beamforming signals from a data signal based on a selected beamforming codeword, wherein generating the plurality of beamforming signals from the data signal is performed by a beamforming processing circuit comprising one of an analog beamforming circuit, a digital beamforming circuit, and a hybrid beamforming circuit;

receiving a suggested beamforming codeword for forming the plurality of beamforming signals; and determining the selected beamforming codeword and the bias voltage control signal based on the suggested beamforming codeword.

9. The method of claim 8, further comprising:

determining the selected beamforming codeword to be identical to the suggested beamforming codeword in response to the suggested beamforming codeword being within a preconfigured capability of a wireless node; and determining the selected beamforming codeword to be one of a plurality of predefined beamforming codewords that is closest to the suggested beamforming codeword in response to the suggested beamforming codeword being beyond the preconfigured capability of the wireless node.

10. The method of claim 8, further comprising:

determining from the suggested beamforming codeword that each of a subset of a plurality of power amplifiers is required to amplify a respective one of a subset of the plurality of beamforming signals to a respective reduced power level; and generating the bias voltage control signal to cause a power management circuit to reduce a subset of the plurality of bias voltages received by the subset of the plurality of power amplifiers, respectively.

11. The method of claim 10, further comprising:

modulating each of the plurality of beamforming signals into a plurality of time-division multiplexing (TDD) frames each comprising a downlink subframe and an uplink subframe separated by a guard time; and reducing the subset of the plurality of bias voltages during the uplink subframe in a respective one of the plurality of TDD frames associated with a respective one of the subset of the plurality of beamforming signals.

12. A wireless communications system (WCS), comprising:

a distribution unit configured to distribute a plurality of data signals; and a plurality of wireless nodes coupled to the distribution unit, wherein each of the plurality of wireless nodes comprises:

a power management circuit configured to generate a plurality of bias voltages based on a bias voltage control signal;

a plurality of power amplifiers each configured to amplify a respective one of a plurality of beamforming signals based on a respective one of the plurality of bias voltages;

a beamforming processing circuit configured to generate the plurality of beamforming signals from a respective one of the plurality of data signals based on a selected beamforming codeword, wherein the beamforming processing circuit is one of an analog beamforming circuit, a digital beamforming circuit, and a hybrid beamforming circuit; and a codeword processing circuit configured to:

receive a suggested beamforming codeword for forming the plurality of beamforming signals; and determine the selected beamforming codeword and the bias voltage control signal based on the suggested beamforming codeword.

13. The WCS of claim 12, wherein the distribution unit is further configured to determine and provide the suggested beamforming codeword to each of the plurality of wireless nodes periodically.

14. The WCS of claim 13, wherein the distribution unit is further configured to provide the suggested beamforming codeword and the respective one of the plurality of data signals to each of the plurality of wireless nodes concurrently.

15. The WCS of claim 12, wherein the codeword processing circuit is further configured to:

determine the selected beamforming codeword to be identical to the suggested beamforming codeword in response to the suggested beamforming codeword being within a preconfigured capability of a respective one of the plurality of wireless nodes; and determine the selected beamforming codeword to be one of a plurality of predefined beamforming codewords that is closest to the suggested beamforming codeword in response to the suggested beamforming codeword being beyond the preconfigured capability of the respective one of the plurality of wireless nodes.

16. The WCS of claim 12, wherein the codeword processing circuit is further configured to:

determine from the suggested beamforming codeword that each of a subset of the plurality of power amplifiers is required to amplify a respective one of a subset of the plurality of beamforming signals to a respective reduced power level; and generate the bias voltage control signal to cause the power management circuit to reduce a subset of the plurality of bias voltages received by the subset of the plurality of power amplifiers, respectively.

17. The WCS of claim 16, wherein:

each of the plurality of beamforming signals is modulated into a plurality of time-division multiplexing (TDD) frames each comprising a downlink subframe and an uplink subframe separated by a guard time; and the power management circuit is further configured to reduce the subset of the plurality of bias voltages during the uplink subframe in a respective one of the plurality of TDD frames associated with a respective one of the subset of the plurality of beamforming signals.

18. The WCS of claim 12, wherein the distribution unit is configured to control radiation direction and/or amplitude of a respective radio frequency (RF) beam emitted by each of the plurality of wireless nodes via a suggested beamforming codeword, and to transmit the suggested beamforming codeword either concurrent to or independent from transmitting a respective one of the plurality of data signals, and to determine the suggested beamforming codeword periodically.

19. The WCS of claim 12, further comprising:

a digital routing unit coupled to the distribution unit; and a plurality of remote units coupled to the digital routing unit via a plurality of optical fiber-based communications mediums.

20. The WCS of claim 19, wherein:

the digital routing unit comprises: an electrical-to-optical (E/O) converter configured to convert a plurality of downlink communications signals into a plurality of downlink optical communications signals, respectively; and an optical-to-electrical (O/E) converter configured to convert a plurality of uplink optical communications signals into a plurality of uplink communications signals, respectively; and the plurality of remote units each comprises: a respective O/E converter configured to convert a respective one of the plurality of downlink optical communications signals into a respective one of the plurality of downlink communications signals; and a respective E/O converter configured to convert a respective one of the plurality of uplink communications signals into a respective one of the plurality of uplink optical communications signals.

* * * * *